United States Patent
Abe (10) Patent No.: US 7,689,040 B2
(45) Date of Patent: Mar. 30, 2010

(54) IMAGE PROCESSING APPARATUS, IMAGE PROCESSING METHOD AND PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1023 days.

(21) Appl. No.: 11/248,774

(22) Filed: Oct. 11, 2005

(65) Prior Publication Data

US 2006/0092486 A1    May 4, 2006

(30) Foreign Application Priority Data

Nov. 1, 2004    (JP)    ............ P2004-318475

(51) Int. Cl.
*G06T 5/00*    (2006.01)
*H04N 1/46*    (2006.01)
(52) U.S. Cl. ............ 382/190; 358/3.27; 358/532
(58) Field of Classification Search ............ 382/190, 382/124, 302, 299, 232, 240; 358/3.27, 532
See application file for complete search history.

(56) References Cited

U.S. PATENT DOCUMENTS

| | | | |
|---|---|---|---|
| 4,945,502 A * | 7/1990 | Kwon et al. | 382/275 |
| 5,467,404 A * | 11/1995 | Vuylsteke et al. | 382/274 |
| 6,031,939 A * | 2/2000 | Gilbert et al. | 382/239 |
| 6,853,318 B1 * | 2/2005 | Rabbani et al. | 341/50 |
| 2004/0120556 A1 * | 6/2004 | Kono et al. | 382/124 |
| 2005/0141774 A1 * | 6/2005 | Deever | 382/240 |

* cited by examiner

*Primary Examiner*—Bhavesh M Mehta
*Assistant Examiner*—Stephen R Koziol
(74) *Attorney, Agent, or Firm*—Sonnenchein Nath & Rosenthal LLP (57) ABSTRACT

An image processing apparatus can improve the image quality of images. The image processing apparatus includes a parameter extracting unit that extracts a parameter for expressing the degree of sharpness of each image when a plurality of images are obtained with different degrees of sharpness by decomposing an original image, using input image data, a parameter adjusting unit that adjusts the parameters of the images extracted by the parameter extracting unit so as to make the original image sharp and a generating unit that generates the original image on the basis of the parameters of the images adjusted by the parameter adjusting unit.

9 Claims, 6 Drawing Sheets

IMAGE PROCESSING APPARATUS, IMAGE PROCESSING METHOD AND PROGRAM

CROSS REFERENCES TO RELATED APPLICATIONS

The present invention contains subject matter related to Japanese Patent Application JP 2004-318475 filed in the Japanese Patent Office on Nov. 1, 2004, the entire contents of which being incorporated herein by reference.

BACKGROUND OF THE INVENTION

1. Field of the Invention

This invention relates to an image processing apparatus, an image processing method and a program that can suitably be applicable to, for instance, an authentication apparatus for biometrically authenticating one or more than one blood vessels of a living body.

2. Description of the Related Art

Authentication apparatus of this kind are adapted to pick up an image of blood vessels, utilizing the property of deoxidized hemoglobin (venous blood) or oxidized hemoglobin (arterial blood) of singularly absorbing rays of the near infrared band (near infrared radiation), and collate the image with the blood vessel images registered in a memory as data for collation.

However, the quantity of light irradiated on a blood vessel per unit area can vary to give rise to an unclear blood vessel image as a function of the variations because blood vessels are three-dimensionally intricately arranged in the inside of the living body.

For this reason, a filtering process that is referred to as Laplacian is typically conducted in authentication apparatus of this kind. With such a filtering process, the edges of blood vessels are emphasized in the obtained image to improve the image quality (see, inter alia, Pat. Document 1: Jpn. Pat. Appln. Laid-Open Publication No. 2003-150934).

SUMMARY OF THE INVENTION

However, known authentication apparatus of the above identified kind still can provide only an unclear image of blood vessels even if the edges of blood vessels are emphasized to consequently make the degree of authentication accuracy often poor.

Additionally, if known authentication apparatus are adapted to emphasize the edges of an object of image pickup operation so as to be used to display an image of blood vessels or a human body, the obtained image is often visually poorly recognizable because the image is not sharp and the image quality is poor.

In view of the above identified circumstances, it is therefore the object of the present invention to provide an image processing apparatus, an image processing method and an image processing program that can improve the image quality of such an image.

In an aspect of the present invention, the above object is achieved by providing an image processing apparatus including: a parameter extracting means for extracting a parameter for expressing the degree of sharpness of each image when a plurality of images are obtained with different degrees of sharpness by decomposing an original image, using input image data; a parameter adjusting means for adjusting the parameters of the images extracted by the parameter extracting means so as to make the original image sharp; and an image generating means for generating the original image on the basis of the parameters of the images adjusted by the parameter adjusting means.

Thus, with an image processing apparatus according to the invention, it is possible to eliminate the unsharp texture, if any, from the entire original image.

In another aspect of the present invention, there is provided an image processing method including: a first step of extracting a parameter for expressing the degree of sharpness of each image when a plurality of images are obtained with different degrees of sharpness by decomposing an original image, using input image data; a second step of adjusting the extracted parameters of the images so as to make the original image sharp; and a third step of producing the original image on the basis of the adjusted parameters of the images.

Thus, with an image processing method according to the invention, it is possible to eliminate the unsharp texture, if any, from the entire original image.

In still another aspect of the present invention, there is provided a program for causing a control apparatus to execute: a first process that extracts a parameter for expressing the degree of sharpness of each image when a plurality of images are obtained with different degrees of sharpness by decomposing an original image, using input image data; a second process that adjusts the extracted parameters of the images so as to make the original image sharp; and a third process that produces the original image on the basis of the adjusted parameters of the images.

Thus, with a program according to the invention, it is possible to eliminate the unsharp texture, if any, from the entire original image.

According to the invention, it is possible to eliminate the unsharp texture, if any, from an entire original image and improve the image quality of the image by extracting a parameter for expressing the degree of sharpness of each image when a plurality of images are obtained with different degrees of sharpness by decomposing the original image, using input image data, adjusting the extracted parameters of the images so as to make the original image sharp and producing an original image on the basis of the adjusted parameters of the images.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Now, an embodiment of the present invention will be described by referring to the accompanying drawings.

(1) Overall Configuration Of Authentication Apparatus

Figure 1:
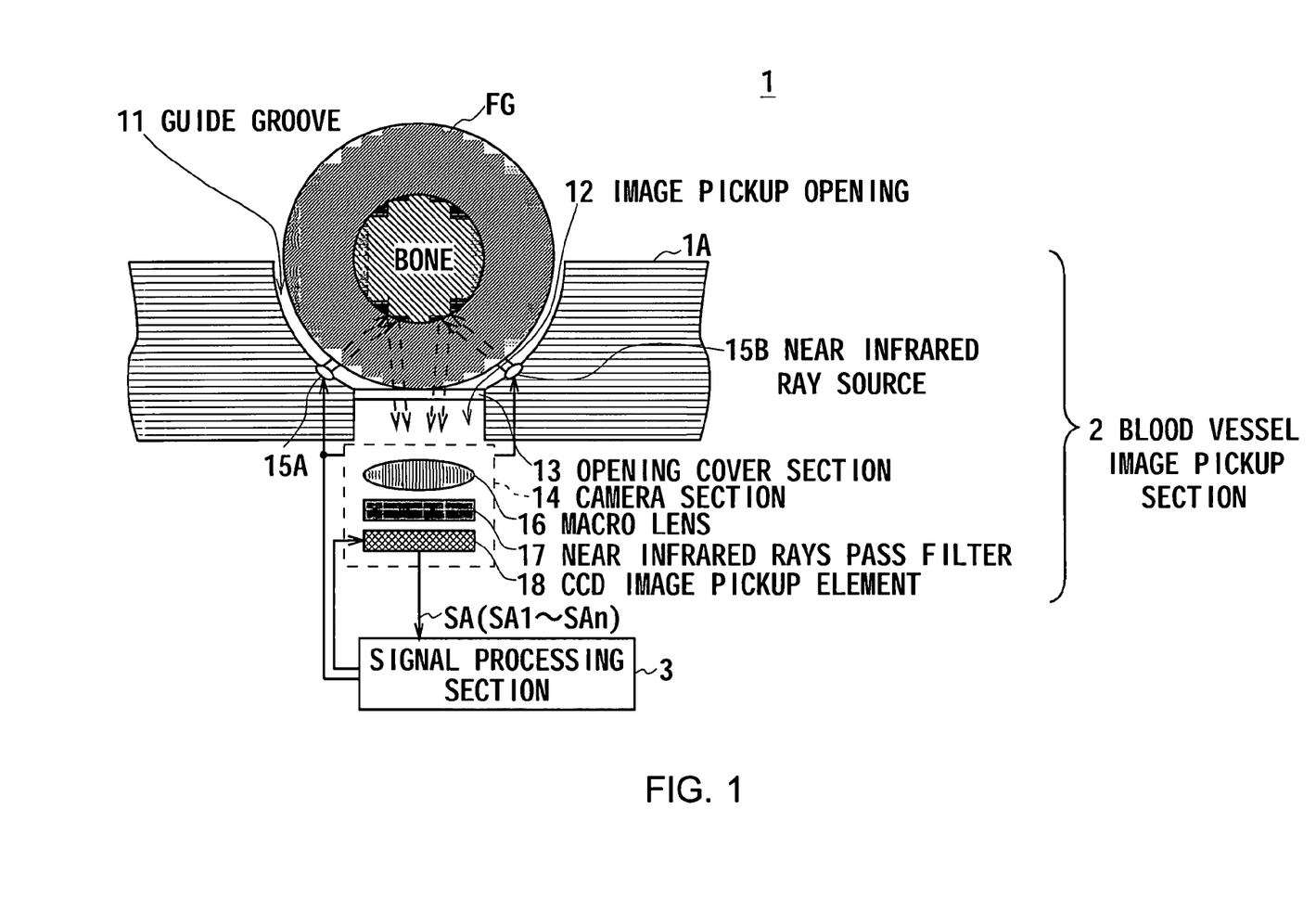
FIG. 1 is a schematic illustration of an authentication apparatus realized by applying an embodiment of the present invention, showing the overall configuration thereof.

Referring to FIG. 1 illustrating an authentication apparatus realized by applying an embodiment of the present invention, 1 denotes the authentication apparatus as a whole, which includes a blood vessel image pickup section 2 and a signal processing section 3 that are connected to each other by way of a cable.

The blood vessel image pickup section 2 has a curved guide groove 11 formed by mimicking a finger FG and arranged at a predetermined position of cabinet 1A of the authentication apparatus 1. The guide groove 11 is provided at the bottom thereof with an image pickup opening 12.

The blood vessel image pickup section 2 is so arranged that, as the finger pad of the finger FG that is placed to cover the guide groove 11 is guided onto the image pickup opening 12 until the finger tip touches the front end of the guide groove 11, the image pickup opening 12 can be positionally adjusted to make itself aligned with the finger FG regardless of the position of the subject.

A colorless transparent opening cover section 13 that is made of a given material is arranged at the front side of the image pickup opening 12 while a camera section 14 is arranged right below the image pickup opening 12 in the cabinet 1A.

A pair of near infrared ray sources 15 (15A and 15B) adapted to irradiate near infrared rays, which are singularly absorbed by hemoglobin in order to pick up an image of a blood vessel, are arranged in parallel with the transversal direction of the guide groove 11 so as to pinch the image pickup opening 12 from the opposite sides. With this arrangement, the finger pad of the finger FG that contacts the guide groove 11 is irradiated with near infrared rays.

Thus, if compared with an arrangement where the finger pad of a finger FG is irradiated with near infrared rays at the bottom thereof, the ratio of the irradiated near infrared rays that are reflected by the surface of the finger FG is remarkably reduced. On the other hand, the near infrared rays that enter the finger FG by way of the surface thereof are absorbed by the hemoglobin passing through the blood vessels of the finger FG and partly scattered by tissues outside the blood vessels but mostly pass through the inside of the finger FG to eventually enter from the finger FG into the camera section 14 sequentially by way of the image pickup opening 12 and the opening cover section 13 as rays projecting a blood vessel (to be referred to as blood vessel projecting rays hereinafter).

In the camera section 14, a macro-lens 16, an infrared pass filter 17 for allowing only near infrared rays with a wavelength range (about 900 [nm] to 1,000 [nm]) that may vary as a function of both oxidizing hemoglobin and deoxidizing hemoglobin and a CCD image pickup element 18 are arranged in a row. Thus, blood vessel projecting rays that enter from the opening cover section 13 are led to the image pickup plane of the CCD image pickup element 18 by way of the macro-lens 16, the near infrared pass filter 17. As a result, the camera section 14 can form an exact image of capillary blood vessels of both the venous system and the arterial system that are found in the inside of the finger FG in an intermingled state.

The CCD image pickup element 18 picks up an image of the blood vessels that are formed on the image pickup plane thereof under the control of the signal processing section 3 and outputs the picked up image as image signals (to be referred to as blood vessel image signals hereinafter) SA1, SA2, . . . , SAn to the signal processing section 3.

Figure 2:
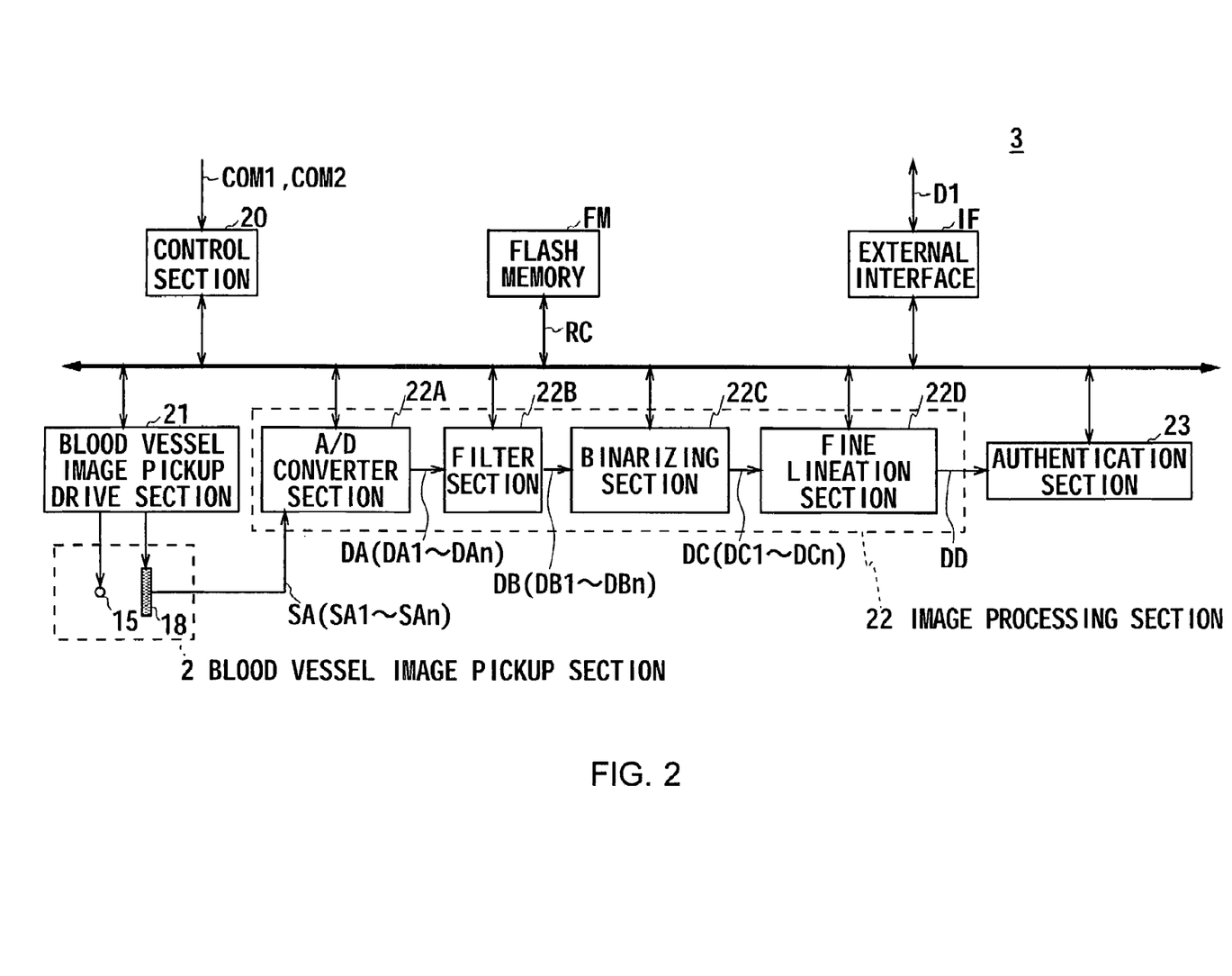
FIG. 2 is a schematic block diagram of the signal processing section of the apparatus of FIG. 1.

On the other hand, as shown in FIG. 2, the signal processing section 3 is formed by connecting a blood vessel image pickup drive section 21, an image processing section 22, an authentication section 23, a flash memory FM and an interface (to be referred to as external interface hereinafter) IF for exchanging data with the outside of the signal processing section 3 to a control section 20.

The control section 20 is a computer including a central processing unit (CPU) that controls the entire authentication apparatus 1, a read only memory ROM) for storing various programs, a random access memory (RAM) that operates as a work memory of the CPU. The CPU is adapted to receive an execution command COM1 for a mode of registering blood vessels of a registered person (to be referred to as blood vessel registration mode hereinafter) or an execution command COM2 for a mode of identifying a registered person him- or her-self (to be referred to as authentication mode hereinafter) according to a corresponding operation of an operation section (not shown) arranged at a predetermined position on the surface of the cabinet 1A of the authentication apparatus 1.

When the execution command COM1 for the blood vessel registration mode is given to the control section 20 from the operation section (not shown), the control section 20 selects the blood vessel registration mode as operation mode according to the corresponding program that is stored in the ROM and controls the blood vessel image pickup drive section 21, the image processing section 22 and the authentication section 23.

Then, the blood vessel image pickup drive section 21 drives the near infrared ray sources 15 and the CCD image pickup element 18 of the camera section 14 to make the blood vessel image pickup section 2 start operating. As a result, near infrared rays are irradiated from the near infrared ray sources 15 onto the finger pad of the finger FG of the subject that is held in contact with the guide groove 11 (FIG. 1) and blood vessel projecting rays that are led to the image pickup plane of the CCD image pickup element 18 by way of the finger FG (FIG. 1) are output sequentially from the CCD image pickup element 18 as blood vessel image signals SA1, SA2, . . . , SAn to A/D (analog/digital) converter section 22A of the image processing section 22.

The A/D converter section 22A executes an A/D conversion process on the blood vessel image signals SA1, SA2, . . . , SAn and transmits the obtained data on the blood vessel image (to be referred to as blood vessel image data hereinafter) DA1, DA2, . . . , DAn to a filter section 22B.

The filter section 22B executes various filtering processes for eliminating noise components and emphasizing contours on the blood vessel image data DA1, DA2, . . . , DAn and transmits the blood vessel image data DB1, DB2, . . . , DBn that are obtained as a result of the filtering processes to a binarizing section 22C.

The binarizing section 22C executes a binarization process on the blood vessel image data DB1, DB2, . . . , DBn and transmits the obtained data on the black and white blood vessel images (to be referred to as binary blood vessel image data hereinafter) DC1, DC2, . . . , DCn to a fine lineation section 22D.

The fine lineation section 22D typically executes a morphology process on the binary blood vessel image data DC1, DC2, . . . , DCn to provide lineation of the blood vessels of the binary blood vessel image on the basis of the binary blood vessel image data DC1, DC2, ..., DCn.

Then, the fine lineation section 22D selects a binary blood vessel image from the plurality of binary blood vessel images showing blood vessels in lineation (to be referred to as blood vessel lines hereinafter) and transmits the binary blood vessel image data DD that correspond to the selected binary blood vessel image to the authentication section 23.

The authentication section 23 generates to-be-registered authentication information RC of a predetermined format from the binary blood vessel image data DD and transmits it to the control section 20.

As the control section 20 receives the to-be-registered authentication information RC from the authentication section 23 by controlling the blood vessel image pickup drive section 21, the image processing section 22 and the authentication section 23, it registers the to-be-registered authentication information RC in the flash memory FM and stops the operation of the blood vessel image pickup section 2 by releasing the control on the blood vessel image pickup drive section 21, the image processing section 22 and the authentication section 23.

Thus, the control section 20 can operate in the blood vessel registration mode in a manner as described above.

When the execution command COM2 for the authentication mode is given to the control section 20 from the operation section (not shown), the control section 20 selects the authentication mode as operation mode according to the corresponding program that is stored in the ROM and controls the blood vessel image pickup drive section 21, the image processing section 22 and the authentication section 23, while it reads out the registered authentication information RC that is registered in the flash memory FM and transmits it to the authentication section 23.

In this case, the blood vessel image pickup drive section 21 starts the blood vessel image pickup section 2 as in the case of above described blood vessel registration mode. The image processing section 22 executes various processes as in the case of the blood vessel registration mode on the blood vessel image signals SA (SA1 to SAn) sequentially output from the blood vessel image pickup section 2 to transmit the obtained binary blood vessel image data DD to the authentication section 23.

The authentication section 23 collates the binary blood vessel image according to the binary blood vessel image data DD with the binary blood vessel image according to the registered authentication information RC read out by the control section 20 from the flash memory FM for the formation pattern of blood vessel lines.

Then, the authentication section 23 decides if the subject whose image is picked up by the blood vessel image pickup section 2 is the registered person or not on the basis of the degree of agreement obtained as a result of the collation and transmits the result of the decision to the control section 20 as decision data D1.

As the control section 20 receives the decision data D1 from the authentication section 23 by controlling the blood vessel image pickup drive section 21, the image processing section 22 and the authentication section 23, it transfers the decision data D1 to the outside by way of the external interface IF and stops the operation of the blood vessel image pickup section 2 by releasing the control on the blood vessel image pickup drive section 21, the image processing section 22 and the authentication section 23.

Thus, the control section 20 can operate in the authentication mode in a manner as described above.

In this way, the authentication apparatus 1 can authenticate a living body, identifying the registered person by means of some of the blood vessels of the person that are vital structures specific to the person and existing in the inside of the living body, so that it can prevent any direct theft from the living body and any third party in disguise of the registered person.

(2) Sharpening Process

In addition to the above-described configuration, the authentication apparatus 1 is adapted to execute a sharpening process for sharpening a blood vessel image in the blood vessel registration mode.

Figure 3:
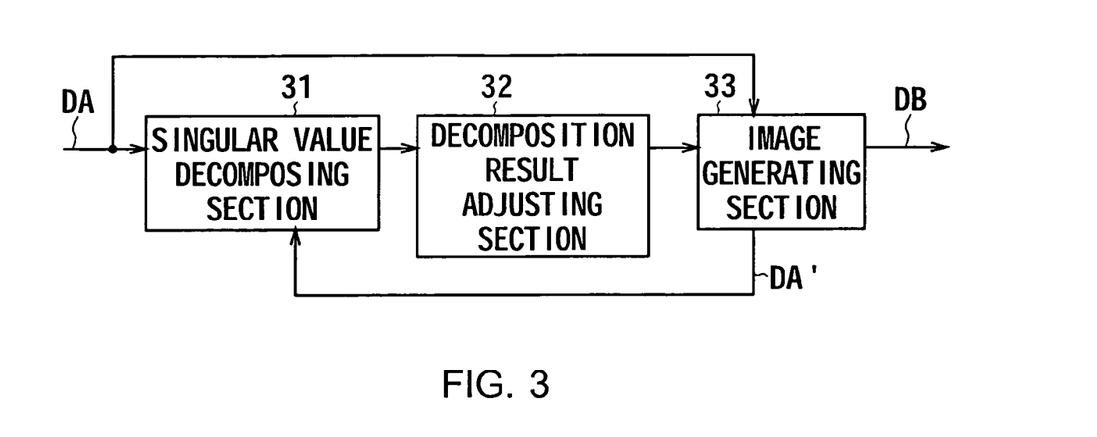
FIG. 3 is a schematic block diagram of the components of the apparatus of FIG. 1 that operate for a sharpening process.

The sharpening process is executed, for example, as a pre-process relative to a filtering process that is conducted by the filtering section 22B (FIG. 2) under the control of the control section 20. To functionally break down the sharpening process, there are provided a singular value decomposing section 31 for executing a singular value decomposition process on a blood vessel image, a decomposition result adjusting section 32 for adjusting the results of the singular value decomposition so as to make the blood vessel image more sharp and an image generating section 33 for generating an blood vessel image (to be referred to as restructured blood vessel image hereinafter) that corresponds to the original blood vessel image and is formed on the basis of the results of the singular value decomposition after the adjustment as shown in FIG. 3.

Now, the singular value decomposition process of the singular value decomposing section 31, the decomposition result adjusting process of the decomposition result adjusting section 32 and the image generation process of the image generating section 33 will be described below in greater detail.

(2-1) Singular Value Decomposition Process

The singular value decomposing section 31 replaces the blood vessel image formed on the basis of the blood vessel image data DA (DA1, DA2, ..., DAn) supplied from the A/D converter section 22A with an m×n matrix containing the luminance values of the pixels of the blood vessel image as matrix components and executes a singular value decomposing process for the replaced blood vessel image (to be referred to as blood vessel image matrix hereinafter).

Such singular value decomposition will be described briefly below. The singular value decomposition is adopted as part of the computation algorithm for numerical matrixes. It is a technique of decomposing an m×n matrix A into the product of multiplication of a column orthonormal matrix U, a diagonal matrix Δ having the singular values of the matrix A as diagonal elements and a orthonormal matrix $V^T$ as expressed by formula (1) below.

$$A = U \Delta V^T \quad (1)$$

The diagonal elements of the diagonal matrix Δ are formed by the values expressing the inner products of the column vectors corresponding to the orthonormal matrixes U and $V^T$. Thus, if the singular values are μ and the column numbers are n (n=1, 2, 3, ...), the diagonal matrix is expressed by formula (2) below.

$$\Delta = \text{diag}(\mu_1, \ldots, \mu_n) \quad (2)$$

Figure 4:
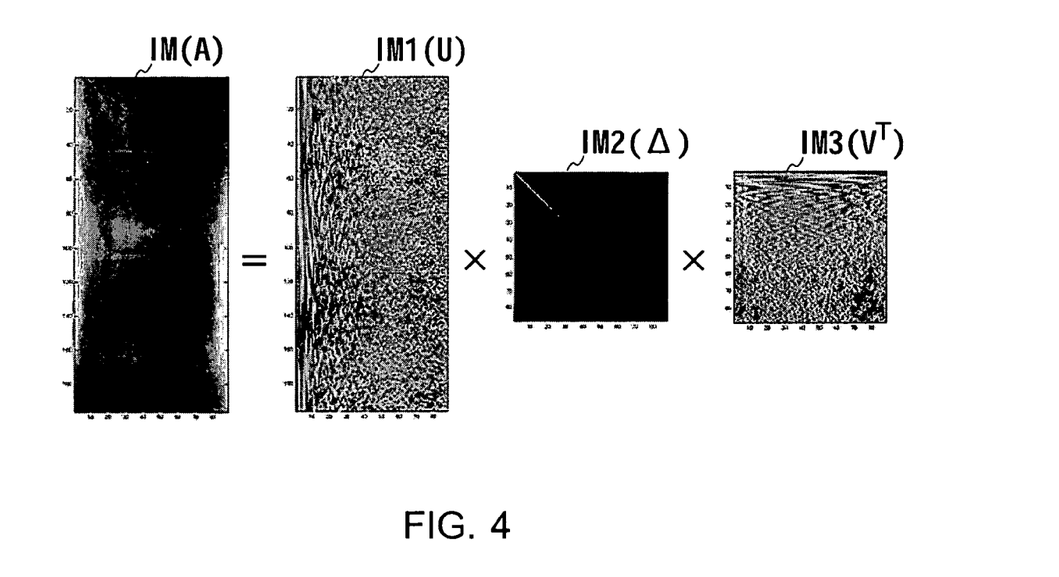
FIG. 4 is schematic illustration of singular value decomposition, showing a state before decomposition and a state after decomposition.

FIG. 4 is schematic illustration of the singular value decomposition of a blood vessel image matrix, showing a state before decomposition and a state after decomposition. In FIG. 4, IM denotes an image that corresponds to the blood vessel image matrix (namely a blood vessel image) and IM1 denotes an image that corresponds to the column orthonormal matrix U, whereas IM2 denotes an image that corresponds to the diagonal matrix Δ and IM3 denotes an image that corresponds to the orthonormal matrix $V^T$.

As clear from FIG. 4, the column orthonormal matrix U and the orthonormal matrix $V^T$ show fine image patterns as the column number increases if compared with the corresponding images IM1 and IM2.

The logarithmic values (log (Δ)) of the diagonal elements are used in FIG. 4 for the image IM2 that corresponds to the diagonal matrix Δ because the proper values of the diagonal elements spread over a wide range. It will be clear by seeing the image IM2 that the diagonal element $\mu_n$ decreases as the column number increases (or $\mu_1 > \ldots > \mu_n$) in the diagonal matrix Δ.

Figure 5:
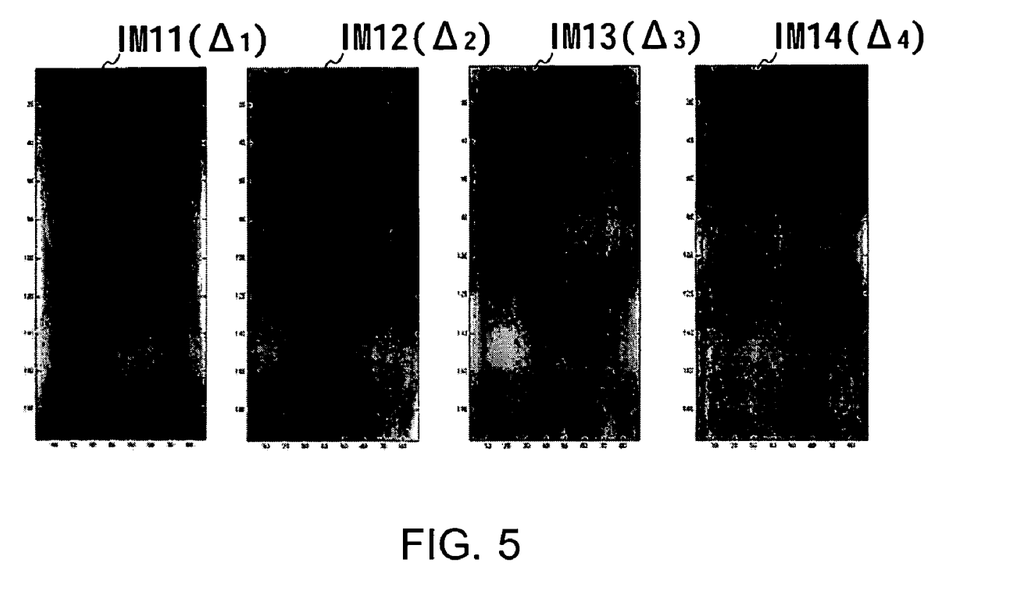
FIG. 5 is a schematic illustration of images formed by diagonal elements.

FIG. 5 is a schematic illustration of images formed by the diagonal elements $\mu_1 \ldots \mu_4$ that correspond to the first through fourth columns respectively of the diagonal matrix Δ.

In FIG. 5, IM11 denotes the image formed by the diagonal element $\mu_1$ that corresponds to the first column (in other words, the image formed by $\Delta_1 = \mathrm{diag}\,(\mu_1, 0, 0, 0, 0, \ldots, 0)$ out of the formula (2)) and IM12 denotes the image formed by the diagonal element $\mu_2$ that corresponds to the second column (in other words, the image formed by $\Delta_2 = \mathrm{diag}\,(0, \mu_2, 0, 0, 0, \ldots, 0)$ out of the formula (2)), while IM13 denotes the image formed by the diagonal element $\mu_3$ that corresponds to the third column (in other words, the image formed by $\Delta_3 = \mathrm{diag}\,(0, 0, \mu_3, 0, 0, \ldots, 0)$ out of the formula (2)) and IM14 denotes the image formed by the diagonal element $\mu_4$ that corresponds to the fourth column (in other words, the image formed by $\Delta_4 = \mathrm{diag}\,(0, 0, 0, \mu_4, 0, \ldots, 0)$ out of the formula (2)).

It will be appreciated by seeing the images IM11 through IM14 and the image IM2 (FIG. 4) corresponding to the diagonal matrix Δ that more sharp images are formed gradually as the column number increases.

Thus, the diagonal elements ($\mu_1$ through $\mu_n$) of the diagonal matrix Δ may be called as parameters that express the respective degrees of sharpness of the images IM11 through IMn when the blood vessel image IM is decomposed into a plurality of images IM11, IM12, ..., IMn of different degrees of sharpness (to be referred to as sharpness parameters hereinafter).

Thus, the singular value decomposing section 31 can extract sharpness parameters that express the respective degrees of sharpness of the images IM11 through IMn when the blood vessel image IM, which is based on the blood vessel image matrix, is decomposed into a plurality of images IM11 through IMn of different degrees of sharpness by subjecting the blood vessel image matrix that is replaced by a multi-dimensional matrix to singular value decomposition.

(2-2) Decomposition Result Adjusting Process

The decomposition result adjusting section 32 adjusts the sharpness parameters (diagonal elements ($\mu_1$ through $\mu_n$)) that are obtained as a result of singular value decomposition so as to make the blood vessel image IM (FIG. 4) sharp.

Actually, the decomposition result adjusting section 32 is adapted to select the diagonal element of the highest order (first column), or $\mu_1$, out of the diagonal elements $\mu_1$ through $\mu_n$, and alter it by pulling down the value thereof to "0".

As a result, as may be clear from FIGS. 4 and 5, the image IM11 of the lowest degree of sharpness is removed from the blood vessel image IM so that the blood vessel image IM is sharpened by it.

In this way, the decomposition result adjusting section 32 is adapted to adjust the sharpness parameters so as to improve the degree of sharpness of the blood vessel image IM (FIG. 4).

(2-3) Image Generating Process

Figure 6A:
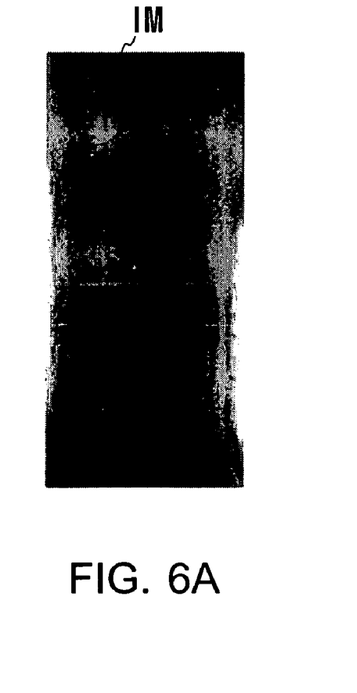
FIGS. 6A and 6B are schematic illustrations of images of a blood vessel before and after a sharpening process.
Figure 6B:
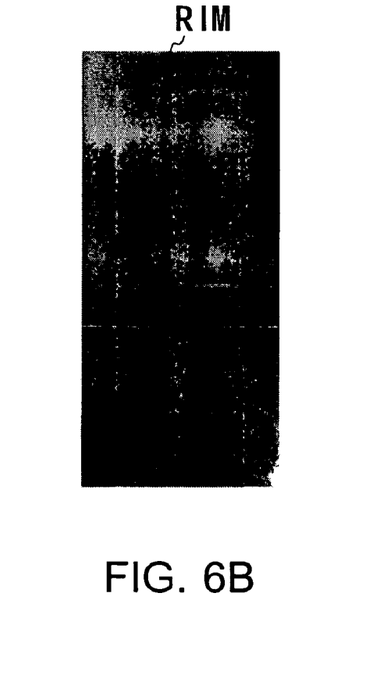

Referring to FIGS. 6A and 6B, the image generating section 33 generates a restructured blood vessel image RIM that corresponds to the original blood vessel image IM, using the adjusted sharpness parameters (diagonal elements ($\mu_1$ through $\mu_n$)).

Actually, the image generating section 33 is adapted to compute the product of multiplication of the diagonal matrix Δ, the value of the diagonal element $\mu_1$ of the highest order (first column) of which is altered to "0", the column orthonormal matrix U and the orthonormal matrix $V^T$. As a result, the remaining images IM12 through IMn, the image IM11 of the lowest degree of sharpness being excepted, are used to synthetically generates the restructured blood vessel image (FIG. 6B), which is sharpened relative to the original blood vessel image IM (FIG. 6A).

When the diagonal element $\mu_1$ is altered to "0" and if the image IM11 formed by the diagonal element μ1 (in other words, the image formed by $\Delta 1 = \mathrm{diag}\,(\mu_1, 0, 0, 0, 0, \ldots, 0)$, using the formula (2)) is $A_1$ and the images IM12 through IMn formed by the remaining unaltered diagonal elements $\mu_2$ through $\mu_n$ (in other words, the images formed by $\Delta_2$ through $_n = \mathrm{diag}\,(0, \mu_2, \mu_3, \ldots, \mu_n)$ is $A_2$ through $_n$, they are expressed by formula (3) below because of the above formula (1).

$$A_1 = U\Delta_1 V^T \qquad (3)$$
$$A_{2\to n} = U\Delta_{2\to n} V^T$$

Thus, the sum of the above formula (3) is expressed by formula (4) below.

$$\begin{aligned}
A_1 + A_{2\to n} &= U\Delta_1 V^T + U\Delta_{2\to n} V^T \\
&= U(\Delta_1 V^T + \Delta_{2\to n} V^T) \\
&= U((\Delta_1 + \Delta_{2\to n})V^T) \\
&= U(\Delta V^T) \\
&= U\Delta V^T = A
\end{aligned} \qquad (4)$$

It may be clear that the restructured blood vessel image (FIG. 6B) is generated as a result of synthetically combining the images IM12 through IMn, the image IM11 of the lowest degree of sharpness being excepted.

Then, the image generating section 33 executes various filtering processes on the data of the restructured blood vessel image RIM (matrix of the restructured blood vessel image) and transmits the obtained blood vessel image data DB (DB1 through DBn) to the binarizing section 22C (FIG. 2).

Thus, the image generating section 33 can generate a restructured blood vessel image RIM in a manner as described above.

In the case of this embodiment, the image generating section 33 is adapted to decide it necessary or unnecessary to readjust the sharpness parameters (diagonal elements ($\mu_1$ through $\mu_n$)) on the basis of the restructured blood vessel image RIM.

Actually, the image generating section 33 is so adapted that, when it generates a restructured blood vessel image RIM, it computes the correlation value between the restructured blood vessel image RIM and the original blood vessel image IM that is formed according to the blood vessel image data DA supplied from the A/D converter section 22A and decides if it is necessary or not necessary to readjust the sharpness parameters.

If the result of the computation is lower than a predetermined threshold value, the image generating section 33 decides that it is not necessary to readjust the sharpness parameters and then transmits the data of the restructured blood vessel image RIM to the binarizing section 22C (FIG. 2) as blood vessel image data DB.

Figure 7:
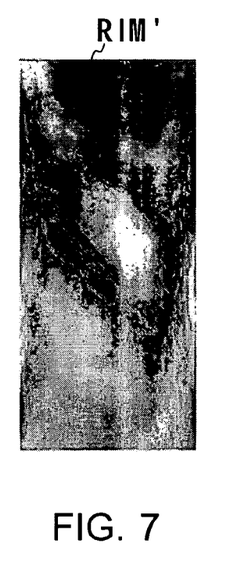
FIG. 7 is a schematic illustration of an image of a blood vessel after a resharpening process.

If, on the other hand, the result of the computation is not lower than the predetermined threshold value, the image generating section 33 decides that it is necessary to readjust the sharpness parameters and then transmits the data of the restructured blood vessel image RIM to the singular value decomposing section 31 as blood vessel image data DA' to be used for resharpening. Then, the restructured blood vessel image RIM is subjected to another sharpening process (singular value decomposition process, decomposition result adjusting process and image generation process) in a manner as described above to generate a restructured blood vessel image RIM' typically as shown in FIG. 7.

When the blood vessel image data DA' of the restructured blood vessel image RIM are subjected to a singular value decomposition process once again, the same value is obtained for the diagonal element $\mu_1$ of the diagonal matrix $\Delta$ despite the value of the diagonal element $\mu_1$ has been altered to "0". From this fact, it will be appreciated that the sharpness parameters that are extracted by singular value decomposition are extracted as relative values for the blood vessel image that are not spatial frequencies.

Thus, the image generating section 33 can decide if it is necessary or not necessary to readjust the sharpness parameters (diagonal elements ($\mu_1$ through $\mu_n$)) on the basis of the restructured blood vessel image RIM in a manner as described above.

(3) Sharpening Process Sequence

Figure 8:
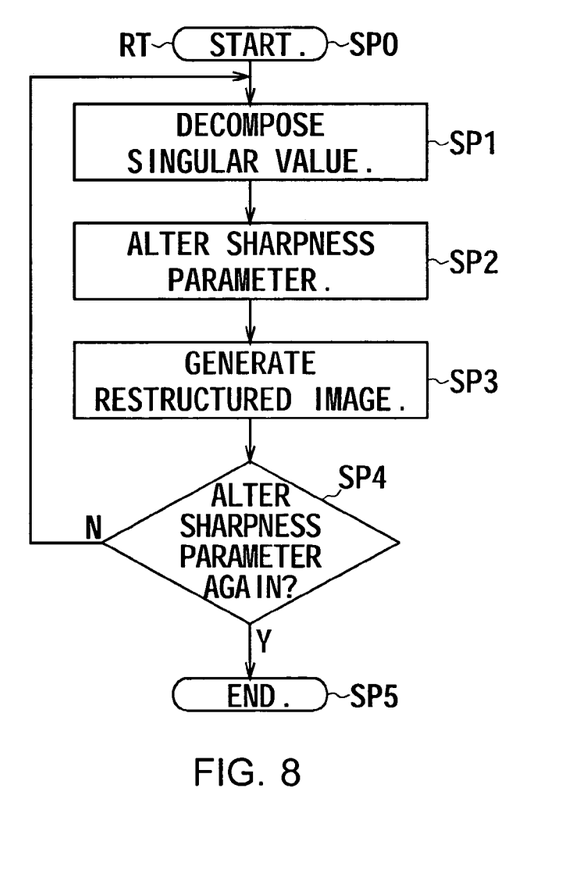
FIG. 8 is a flowchart of the sharpening process.

The above-described sharpening process of the control section 20 is executed by following the sharpening process sequence RT illustrated in FIG. 8.

More specifically, when the control section 20 finishes the A/D conversion process on the blood vessel image signal SA (SA1, SA2, . . . , or SAn), it starts a sharpening process at Step SP0 of the sharpness process sequence RT. Then, in the next step, or Step SP1, it decomposes the blood vessel image IM formed on the basis of the blood vessel image data DA (DA1, DA2, . . . , or DAn) obtained as a result of the A/D conversion process into the product of multiplication of the column orthonormal matrix U, the diagonal matrix $\Delta$ and the orthonormal matrix $V^T$ by means of singular value decomposition (FIG. 4).

Subsequently, in Step SP2, the control section 20 alters the value of the diagonal element of the highest order, or $\mu_1$, out of the diagonal elements $\mu_1$ through $\mu_n$ of the diagonal matrix $\Delta$ to "0" and, in the next step, or Step SP3, it generates a restructured blood vessel image RIM (FIG. 6B) by computing the product of multiplication of the diagonal matrix $\Delta$, the value of the diagonal element μ1 of which is altered to "0", the column orthonormal matrix U and the orthonormal matrix $V^T$.

Then, in the next step, or Step SP4, the control section 20 computes the correlation value between the restructured blood vessel image RIM and the original blood vessel image IM and decides if it is necessary or not necessary to readjust the sharpness parameters according to the result of the computation.

If the result of the computation is not lower than a predetermined threshold value, it means that there is large room for resharpening and hence the control section 20 returns to Step SP1 to repeat the above process on the restructured blood vessel image RIM (FIG. 6B) that is generated in Step S3 and generate a new restructured blood vessel image RIM' (FIG. 7).

If, on the other hand, the result of the computation is lower than the threshold value, it means that there is little room for resharpening and hence the control section 20 moves to Step SP5 to end the sharpening process sequence RT.

Thus, the control section 20 can execute a sharpening process in a manner as described above.

(4) Operation And Advantages

The authentication apparatus 1 having the above described configuration subjects the blood vessel image data DA to singular value decomposition and extracts the sharpness parameters that express the respective degrees of sharpness of the images IM1 through IMn obtained by decomposing the blood vessel image IM (FIG. 4) into the plurality of images IM11 through IMn (FIG. 5) showing different degrees of sharpness as the diagonal elements $\mu_1$ through $\mu_n$ of the diagonal matrix $\Delta$ that is obtained as a result of the singular value decomposition.

Then, for the purpose of sharpening the original blood vessel image IM, the authentication apparatus 1 alters the value of the diagonal element $\mu_1$ of the higher order of the diagonal matrix $\Delta$ and generates a restructured blood vessel image RIM (FIG. 6B) that corresponds to the original blood vessel image IM on the basis of the post-alteration sharpness parameters.

Thus, the authentication apparatus 1 can eliminate the unsharp texture, if any, from the entire original image IM by removing a rough meandering (image IM11) in the luminance values of the blood vessel image IM. Then, as a result, it is possible to show the blood vessel to be authenticated in the blood vessel image IM.

The authentication apparatus 1 can decide if it is necessary or not necessary to readjust the sharpness parameters on the basis of the restructured blood vessel image RIM (FIG. 6B) in order to further eliminate the unsharp texture, if any, from the image IM depending on the condition of the blood vessel image IM so that it is possible to more clearly show the blood vessel to be authenticated in the blood vessel image IM.

Thus, with the above described arrangement, it is possible to eliminate the unsharp texture, if any, from the entire blood vessel image IM to improve the image quality by subjecting the blood vessel image data DA to singular value decomposition, altering the value of the diagonal element $\mu_1$ of the highest order out of the diagonal elements $\mu_1$ through $\mu_n$ of the diagonal matrix $\Delta$ obtained by the singular value decomposition to "0" and generating a restructured blood vessel image RIM (FIG. 6B) that corresponds to the original blood vessel image IM (FIG. 6A) on the basis of the post-alteration sharpness parameters.

(5) Other Embodiments

While singular value decomposition is used for the parameter extracting means of the above described embodiment to extract parameters that express the degrees of sharpness of the plurality of images of different degrees of sharpness that are obtained by decomposing an original image according to the input image data, the present invention is by no means limited thereto and various other techniques may be used to determine the degree of sharpness of each of the images obtained by decomposing an original image. Any such means can provide advantages similar to those pointed out above.

While blood vessel image data that are obtained by picking up an image of the blood vessels that are found in the inside of a living body are used as input image data in the above described embodiment, the present invention is by no means limited thereto and the present invention can be applied to any of various other objects of authentication including a fingerprint on the surface of a living body, a pattern of paper such as a water mark or nervous tissues in the inside of a living body. When nervous tissues of a living body are used as object of authentication, a marker that exerts a singular effect to nervous tissues may need to be injected into the living body and an image of the marker may have to be picked up. With such an arrangement, it is possible to select nervous tissues as object of authentication.

Furthermore, the present invention can be applied not only to image data of the above described type but also ordinary image data that can obtained by picking up a background or a subject, which may typically be a person.

While the sharpness parameter (diagonal element $\mu_1$) of the image IM11 showing the lowest degree of sharpness is altered by the parameter adjusting means for adjusting the parameters of images in order to sharpen the original image in the above described embodiment, the present invention is by no means limited thereto and it may alternatively be so arranged that the parameter adjusting means alters the sharpness parameters of the images IM12, IM13, . . . , whose degrees of sharpness are lower than an intermediate value or the sharpness parameters (diagonal elements $\mu_2, \mu_3, \ldots$ or $\mu_{(n/2-1)}$) of the image IM(n/2−1).

Additionally, while the sharpness parameter (diagonal element $\mu_1$) is altered to "0" in the above-described embodiment, the present invention is by no means limited thereto and may alternatively be pulled down by a predefined value or by a predefined ratio.

Alternatively, the sharpness parameters (diagonal element $\mu_{(n/2+1)}, \mu_{(n/2+2)}, \ldots$, or $\mu_n$) of the images IM(n/2+1), IM(n/2+2), . . . , or IMn, whichever appropriate, may be pulled up by a predefined value or by a predefined ratio.

The number of sharpness parameters to be altered for adjustment may be two or more than two.

Figure 9:
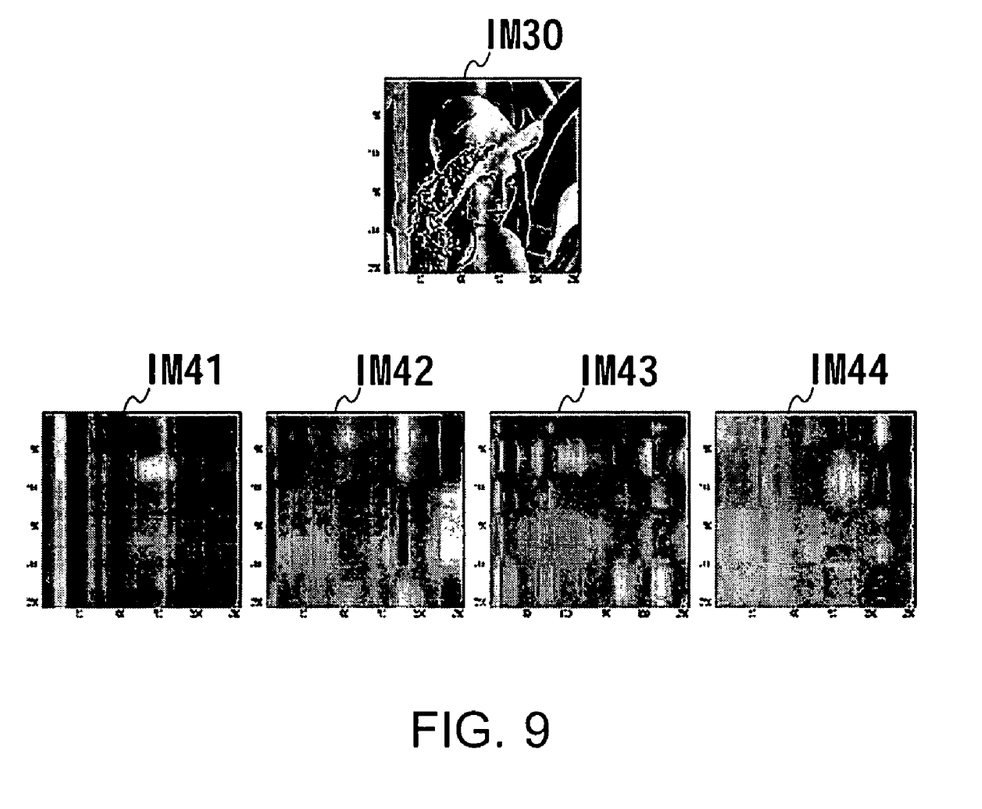
FIG. 9 is a schematic illustration of images formed by diagonal elements.

As seen from the images IM11 through IM14 illustrated in FIG. 5 and formed by the diagonal elements $\Delta\mu_1$ through $\mu_4$ obtained by decomposing the above described blood vessel image IM by singular value decomposition, the sharpness parameters show values that gradually increase stepwise as the column number falls from a higher order to a lower order. However, in the case of ordinary images, the sharpness parameters may not necessarily gradually increase stepwise as the column number falls from a higher order to a lower order as may be clear by seeing images IM41 through IM44 illustrated in FIG. 9 and formed by the diagonal elements $\Delta\mu_1$ through $\mu_4$ obtained by decomposing an ordinary image (lenna) IM30. Therefore, it may be effective to define the above described various conditions of adjustment in advance for different performances of CCD image pickup elements 18 and optical systems, different types of objects of image pickup operations and different image pickup conditions and keep them in a database.

While the original image is regenerated by inverse singular value decomposition on the basis of the adjusted parameters of images in the above described embodiment, the present invention is by no means limited thereto and any of various other inverse conversion techniques may be used for the extracting means of an authentication apparatus according to the invention to provide advantages similar to those of the above-described embodiment.

While the present invention is applied to an authentication apparatus 1 in the above-described embodiment, the present invention is by no means limited thereto and the present invention can be applied to any of various other image processing apparatus adapted to deal with image data. Then, such an apparatus can provide advantages similar to those of the above-described embodiment.

The present invention can find applications in the field of image processing where the image quality that is produced on the basis of image data is important.

It should be understood by those skilled in the art that various modifications, combinations, sub-combinations and alternations may occur depending on design requirements and other factors insofar as they are within the scope of the appended claims or the equivalents thereof.

What is claimed is:

1. An image processing apparatus comprising:
a parameter extracting unit that extracts a parameter for expressing the degree of sharpness of each of a plurality of images, each said image obtained with a different degree of sharpness by decomposing an original image, using input image data, each parameter being an element of a diagonal matrix, said diagonal matrix obtained as a result of said decomposing of the original image, said decomposing performed by singular value decomposition;
a parameter adjusting unit that adjusts each extracted parameter so as to sharpen the original image; and
an image generating unit that generates an output image on the basis of the adjusted parameters,
wherein,
the parameter extracting unit extracts stepwise parameters expressing the degrees of sharpness of the images according to the degrees of sharpness, and
the parameter adjusting unit alters the extracted parameters by at least one of: (a) pulling down an extracted parameter of an image showing a low degree of sharpness; and (b) pulling up an extracted parameter of an image showing a high degree of sharpness.

2. The apparatus according to claim 1, wherein the image data are those obtained as a result of picking up an image of an object of authentication in a living body.

3. The apparatus according to claim 1, further comprising:
a deciding unit for deciding if it is necessary or not necessary to readjust the parameters of the images on the basis of the original image generated by the image generating unit.

4. A method executed by an image processing apparatus, said apparatus comprising a parameter extracting unit, a parameter adjusting unit and an image generating unit, said method comprising:
a first step of extracting, with the parameter extracting unit, a parameter for expressing the degree of sharpness of each of a plurality of images, each said image obtained with a different degree of sharpness by decomposing an original image, using input image data, each parameter being an element of a diagonal matrix, said diagonal matrix obtained as a result of said decomposing of the original image, said decomposing performed by singular value decomposition;
a second step of adjusting, with a parameter adjusting unit, each extracted so as to sharpen the original image; and
a third step of producing, with an image generating unit, an output image on the basis of the adjusted parameters,
wherein,
the first step is adapted to extract stepwise parameters expressing the degrees of sharpness of the images according to the degrees of sharpness, and
the second step is adapted to alter the extracted parameters by at least one of: (a) pulling down an extracted parameter of an image showing a low degree of sharpness; and (b) pulling up an extracted parameter of an image showing a high degree of sharpness.

5. The method according to claim 4, wherein
the image data are those obtained as a result of picking up an image of an object of authentication in a living body; and.

6. The method according to claim 4, further comprising:
a fourth step of deciding if it is necessary or not necessary to readjust the parameters of the images on the basis of the generated original image.

7. A computer-readable medium containing instructions that cause a program in a data processing system for causing a control apparatus to execute:
a first process that extracts a parameter for expressing the degree of sharpness of each of a plurality of images, each said image obtained with a different degree of sharpness by decomposing an original image, using input image data, each parameter being an element of a diagonal matrix, said diagonal matrix obtained as a result of said decomposing of the original image, said decomposing performed by singular value decomposition;

a second process that adjusts each extracted parameter so as to sharpen the original image; and
a third process that generates an output image on the basis of the adjusted parameters,
wherein,
the second process is adapted to extract stepwise parameters expressing the degrees of sharpness of the images according to the degrees of sharpness, and
the second process is adapted to alter the extracted parameters by at least one of: (a) pulling down an extracted parameter of an image showing a low degree of sharpness; and (b) pulling up an extracted parameter of an image showing a high degree of sharpness.

8. The program according to claim 7, wherein
the image data are those obtained as a result of picking up an image of an object of authentication in a living body.

9. The program according to claim 7, further comprising:
a fourth process that decides if it is necessary or not necessary to readjust the parameters of the images on the basis of the generated original image.

\* \* \* \* \*